Sept. 19, 1961   F. E. SCHLAU   3,000,999

BATTERY BOX

Original Filed Feb. 23, 1959

INVENTOR.
F. E. SCHLAU
BY
ATTORNEY

United States Patent Office

3,000,999
Patented Sept. 19, 1961

3,000,999
BATTERY BOX
Floyd E. Schlau, Moline, Ill., assignor to Strombeck-Becker Mfg Co., Moline, Ill., a corporation of Illinois
Original application Feb. 23, 1959, Ser. No. 795,839. Divided and this application Mar. 24, 1960, Ser. No. 17,275
3 Claims. (Cl. 136—173)

This application is a division of copending application Serial No. 795,839 and the invention relates to a toy vehicle and more particularly to an electrically powered vehicle. The invention has for a principal object the provision of an improved and novel vehicle which may be powered by self-contained electrical means, such as conventional dry-cell batteries. It is another main object to provide the toy with design features enabling its production and sale in kit form and further enabling its conversion from self-propulsion to track control and vice versa.

In the adaptation of the vehicle as powered by its own source of electrical power, it is an object of the invention to provide novel means for compactly arranging the interior components, including the batteries, a small electric motor and related elements in such manner as to facilitate assembly, disassembly, servicing and adjustment.

The interchangeable steering means features a part, preferably in the form of a tie rod, that may be reversed as to position so as to be bi-positionable, in one position cooperating with a retaining part to perform the selective steering function and in its other position being free from the retaining part so as to enable the vehicle to freely follow a track, for example. In this respect, the invention features a removable and mountable battery box or container of simple design in which the container is so constructed as to enable the ready achievement of electrical connections without soldering and other complicated terminals.

The foregoing and other important objects and desirable features inherent in and encompassed by the invention will become apparent as a preferred embodiment of the invention is disclosed by way of example in the ensuing description and accompanying sheet of drawings, the several features of which are described below.

Figure 1:
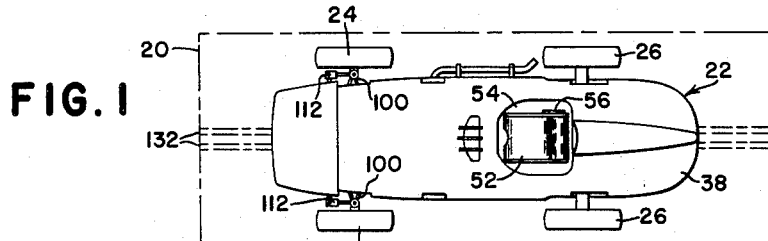
FIGURE 1 is a plan view of a typical vehicle, shown in relation to a representative track or "roadway," the latter being shown in broken lines.
Figure 2:
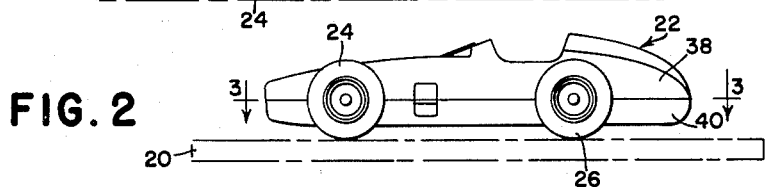
FIGURE 2 is a side elevation of the structure shown in FIGURE 1.
Figure 3:
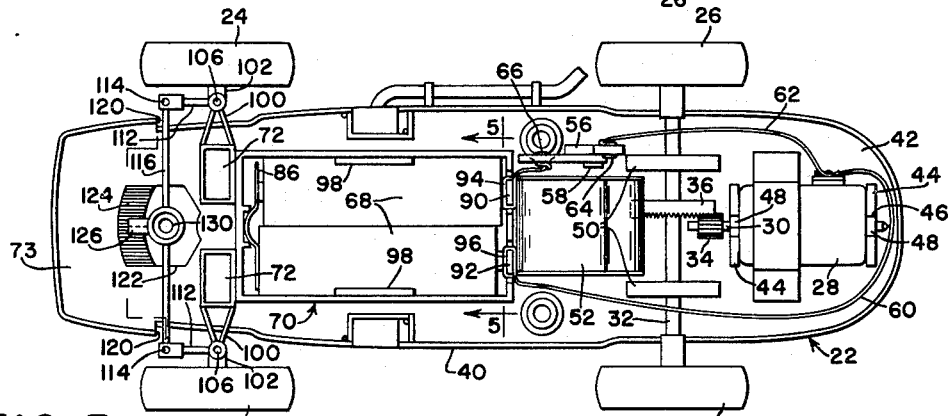
FIGURE 3 is an enlarged plan with the upper half of the body removed along a parting line coincident with the line 3—3 of FIGURE 2.

The invention provides a self-propelled unit having its own source of electrical power, in which case it may be operated over any suitable surface and may be adapted for travel over a track or "roadway," such as that designated generally by the numeral 20 in FIGURES 1 and 2.

The vehicle shown here is representative of a scale-model racing car; although, it may obviously assume any form capable of exploiting the principles and advantages of the invention. In its illustrated form, it has a fore-and-aft body 22 carried on front and rear wheels 24 and 26, respectively, and is self-propelled by an electric motor 28 of conventional nature having an output shaft 30 connected to a rear axle 32 via disconnectible drive means comprising a pinion 34 on the motor shaft and a side gear 36 on the axle. The body is preferably of two-piece construction, having upper and lower complementary shell-like halves 38 and 40, respectively, cemented together along a parting line or surface coincident with the section line 3—3 in FIGURE 2, but it may be otherwise constructed. In the present case, the bottom half 40 of the body has a rear floor part 42 from which rise fore-and-aft spaced apart supports or mounts 44, the bottom half being preferably of molded plastic or of any similar construction and material of which the mounts 44 may be integral parts. Each support or mount 44 has an upwardly facing notch 46 which receives a cooperative trunnion 48 on the motor, and these notches are upwardly convergent and the plastic material has inherent yieldability so that the trunnions, slightly oversize as respects the entrances to the notches, are received in the notches in a snap-in, snap-out fashion, whereby the motor may be readily installed or removed. Of course, the drive gears 34 and 36 are readily disengageable and engageable during this procedure. Because of the molded nature of the structure, the mounts 44 may be accurately located with the precision necessary in a toy of this type. Electric motors of the character shown are well known and the details thereof are not important, aside from the provision of the trunnions as constructed relative to the notches 46. Journals 50 for the rear axle 32 may likewise be molded as integral parts of the bottom shell 40. A cockpit or seat 52 is disposed ahead of the axle and the top shell has an opening 54 therein vertical register with and to accommodate this seat and to afford access to a switch lever 56 pivoted to the seat on a transverse pivot 58.

The motor has a pair of leads or wires 60 and 62, the former of which is electrically connected to a contact 64 on the lever. The lever is shown in its "off" position, with the contact 64 spaced from a fixed contact 66 on the seat, and the contact 66 is wired, in a manner to be described, to one side of the battery means, here a pair of small dry-cell batteries 68 arranged in series and received or mounted removably in a battery container or box 70 disposed fore-and-aft just ahead of the seat 52. This box is removably confined between opposite sides of the body and, as to fore-and-aft position, is confined between the seat and a pair of laterally spaced apart front supports 72 which, like the axle journals 50, may be integral with a forward floor 73 of the bottom shell of the body; although, these supports may be provided as separate elements cemented in place, either at the factory or as part of the kit assembly. The battery box is thus in a compartment ahead of the seat 52 and the motor and rear axle are in a compartment behind the seat.

Figure 4:
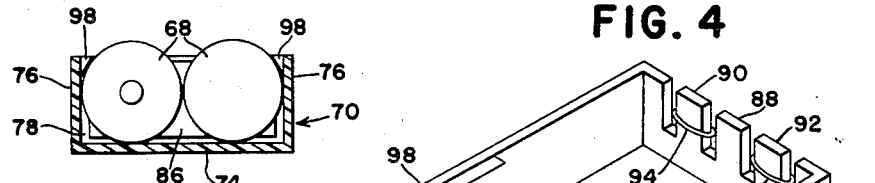
FIGURE 4 is an enlarged perspective of the battery container.
Figure 5:
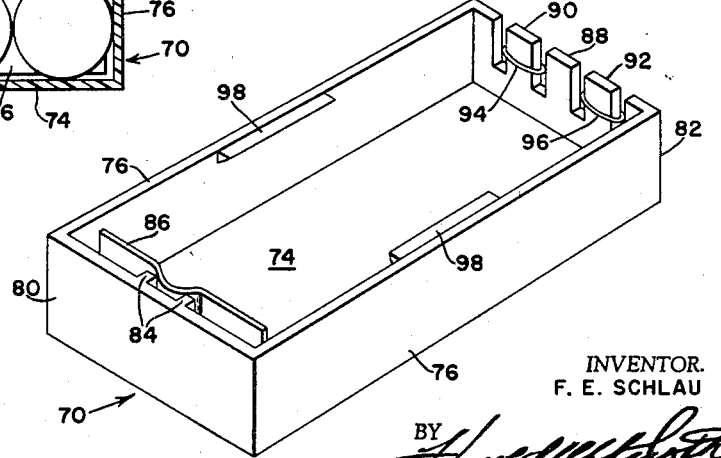
FIGURE 5 is an enlarged section on the line 5—5 of FIGURE 3.

The battery box 70 is shown by itself in FIGURE 4 as having a floor 74, opposite sides 76 and opposite ends 80 and 82, all molded as a one-piece structure. The interior of the end wall 80 has a pair of closely spaced apart upright lugs 84 which serve to locate a metal terminal or contact plate 86 which abuts the proximate reversed ends of the batteries 68. The other end is slit or otherwise formed as shown to afford three prongs or fingers, one of which is central at 88 and the others of which flank the finger 88 at 90 and 92. A wire from the contact 66 on the seat 52 is wrapped about the finger 90 as a loop 94, and the free end of the motor lead or wire 60 is wrapped or looped at 96 about the other flanking finger 92. These fingers and the wrapped or looped wires afford terminals in contact with the reversed ends of the batteries opposite the ends in contact with the metal plate 86 and thus enable completion of the electrical circuit to energize the motor 28 when the lever 56 is swung forward to close the circuit via the contacts 64 and 66. Wrapping of the wires about the fingers 90 and 92 enables the achievement of effective electrical connections, especially in conjunction with the pressure exerted by the ends of the batteries under the action of the plate 86, which is of spring steel and thus has inherent force in a rearward direction to urge the batteries rearwardly to improve the contacts at the wire loops 94 and 96. Each side wall 76 of the box has an upper inwardly overhanging lug 98 to hold the batteries against inadvertent upward displacement. At the same time, the dimensions of the box and the plastic material of which it is composed, permit sufficient temporary laterally outward distortion of the side walls 76 to enable deliberate removal of the batteries. The battery box itself is of compact, simple construction and its arrangement, confined between the body side walls and between the seat 52 and front supports 72, adds not only to the compactness of the assembly but enables substantial economies in manufacture. Besides, the battery box and batteries may be readily removed for installation of new batteries and may be removed entirely when the vehicle is converted for operation from the track 20, as will appear subsequently. Likewise, being a separate piece, it may be easily replaced in case of loss or breakage.

The front end structure of the vehicle has rigid thereon at each side thereof upper and lower lateral support arms 100 and each pair of arms receives therebetween a steering knucle 102 which has an integral lateral spindle (not shown) on which the proximate front wheel 24 is journaled, much in the fashion of typical automotive construction. The connection between each pair of arms and its knuckle affords a pivot 106 on an upright axis.

Each knuckle has a forwardly projecting steering arm 112 rigid thereon and each arm has a bifurcated front end apertured in vertical alinement at 114. Cross-connecting or tie rod means 116 spans the front ends of the steering arms and this tie rod has opposite ends provided with upright pintles (not shown) respectively received by the apertures 114 to afford vertical pivots.

As previously described, the front part of the lower half 40 of the vehicle body 22 has the front floor portion 73. This is turned up at opposite sides to blend into the sides of the body, each of which is apertured at 120 to accommodate the support arms 100 and the ends of the tie rod 116. In addition, the floor 73 has an opening 122 therein which exposes the central part of the tie rod from below, and a forward part of the floor along the front of the opening comprises a notched or serrated body part 124 which cooperates with a tie rod part or element in the form of a tooth 126.

As already outlined, the body is preferably of molded plastic and accordingly the floor 73, particularly in the area of the serrated part 124, has a certain amount of yieldability. Hence, engagement of the tooth 126 with the serrations is not rigidly positive but is rather one of limited yieldability commensurate with the feature of selective settability and retention of a steered position of the wheels. That is to say, the tooth 126 normally engages the serrated part 124 with sufficient force to establish a resistance effective to retain a selected steered position of the front wheels, yet the resistance to steering may be overcome by manual lateral force applied for example to one of the front wheels to change the steerable wheels as to position. Hence, the vehicle, self-propelled by the motor 28, may be caused to travel straight ahead or in a circle determined by the setting of the steered position of the wheels and manual changes may be effected when desired.

When the vehicle is used with the track 20, whether powered by its own batteries or energized directly from the track, it is desired that it be capable of following the track. The representative track or roadway section shown is typical of those which may be assembled end-to-end to form any of several types of circuitous paths or routes and the basic road bed may be of plastic, rubber, etc. or any other form of insulating material having desirable properties of strength, relative rigidity, etc. Such track will carry centrally thereof (in the one-lane type) a pair of metallic strips, as at 132, suitably carried by the bed and being spaced apart will afford a groove which is capable of receiving loosely therebetween a follower (not shown) which extends axially slidably and rotatably through the bore 130 in the tie rod. Since the tie rod is ahead of the knuckle pivots 106, changes in curvature in the track will cause the tie rod to shift laterally, thus causing the wheels to be steered in conformity to the track. Likewise, when the track is straight, the wheels will follow straight ahead. In this phase of operation, it is desired that the steering system be free of the resistance involved between the tooth 126 and the serrated part 124, and this is achieved by the design of the tie rod and its connections to the steering arms 112 which enables removal of the tie rod and reversal thereof for reconnection in a new position so that the tooth 126 is free from the serrated part 124. For this purpose, the tie rod 116 is symmetrical from end to end and is also symmetrical at each end, which is true also of the bifurcated ends of the steering arms. Hence, the tie rod may be removed, turned about its lengthwise axis through 180° and reinstalled with the tooth 126 at the top and pointed rearwardly.

When the track is energized via the strips 132, as outlined above, the follower device may also incorporate an electrical pickup means connectible to the contact 66 and to the motor wire 60 in lieu of the battery connections at 94 and 96. Likewise, the vehicle may be self-propelled by the battery means, and may still travel over and be guided by the track, in which case the electrical pickup means is not required.

The foregoing covers the salient features of a commercially acceptable design in which the several objects outlined, having been found to be significant, are readily accomplished. Other objects and advantages will occur to those versed in the art, as will many modifications of the inventive embodiment disclosed, all of which are capable of exploitation without departure from the spirit and scope of the invention.

What is claimed is:

1. A battery carrier for use in a toy vehicle, comprising: a one-piece box of non-metallic material having a bottom, opposite side and end walls and an open top and of such length, width and depth as to carry a pair of cylindrical dry-cell batteries side-by-side therein and lengthwise thereof, one of said end walls having a plurality of upright slots therein opening at the upper marginal edge of said end wall and providing a pair of upright fingers having free upper terminal ends and spaced apart laterally on the order of the spacing between the axes of a pair of batteries carried in the box, said fingers being adapted to respectively receive loops of electrical conductors for contact respectively with the ends of the batteries adjacent to said fingers, and a metallic element disposed laterally across the inner face of the opposite end wall of the box to bridge and make electrical contact with the ends of the batteries proximate to said end wall, said element being of springy metal biased to urge the batteries toward the fingers and said box being of such length as respects the length of the batteries that the batteries are forced into contact with the loops.

2. A battery carrier for use in a toy vehicle, comprising: a one-piece box of non-metallic material having a bottom, opposite side and end walls and an open top and of such length, width and depth as to carry a pair of cylindrical dry-cell batteries side-by-side therein and lengthwise thereof, one of said end walls having a plurality of upright slots therein opening at the upper marginal edge of said end wall and providing a pair of upright fingers having free upper terminal ends and spaced apart laterally on the order of the spacing between the axes of a pair of batteries carried in the box, said fingers being adapted to respectively receive loops of electrical conductors for contact respectively with the ends of the batteries adjacent to said fingers, and a metallic element disposed laterally across the inner face of the opposite end wall of the box to bridge and make electrical contact with the ends of the batteries proximate to said end walls, said element being of springy metal biased to urge the batteries toward the fingers and said box being of such length as respects the length of the batteries that the batteries are forced into contact with the loops to retain said loops in place, and each side wall having laterally inwardly directed portions respectively overhanging the batteries to normally confine the batteries against vertical escape from the box, said side walls being inherently flexible to permit forcible spreading thereof sufficiently to clear said portions from their overhanging relation to the batteries so as to enable upward removal of the batteries from the box.

3. The invention defined in claim 1, in which: said opposite end wall has means providing a centrally disposed upright recess facing inwardly of the box and the metallic element has a part received in said recess whereby said element is frictionally retained in engagement with the lug means by the endwise forces of the batteries in contact therewith and is positively confined against lateral displacement by receipt in said recess.

References Cited in the file of this patent

UNITED STATES PATENTS

| | | |
|---|---|---|
| 1,576,700 | Zieschang | Mar. 16, 1926 |
| 1,879,595 | Voorhees | Sept. 27, 1932 |
| 2,465,114 | Oury | Mar. 22, 1949 |
| 2,478,887 | Nelson | Aug. 9, 1949 |
| 2,522,660 | Bledsoe | Sept. 19, 1950 |
| 2,818,463 | Parker | Dec. 31, 1957 |

FOREIGN PATENTS

| | | |
|---|---|---|
| 377,925 | Germany | June 29, 1923 |